(12) United States Patent
Miyamoto

(10) Patent No.: US 9,870,118 B2
(45) Date of Patent: Jan. 16, 2018

(54) NON-TRANSITORY STORAGE MEDIUM ENCODED WITH COMPUTER READABLE INFORMATION PROCESSING PROGRAM, INFORMATION PROCESSING APPARATUS, METHOD OF CONTROLLING INFORMATION PROCESSING APPARATUS, AND INFORMATION PROCESSING SYSTEM, CAPABLE OF CONTROLLING VIRTUAL CAMERA WHILE GRASPING OVERALL CONDITION OF VIRTUAL CAMERA ARRANGED IN VIRTUAL SPACE

(71) Applicant: NINTENDO CO., LTD., Kyoto-shi, Kyoto (JP)

(72) Inventor: Shigeru Miyamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 27 days.

(21) Appl. No.: 14/490,049

(22) Filed: Sep. 18, 2014

(65) Prior Publication Data
US 2015/0355814 A1    Dec. 10, 2015

(30) Foreign Application Priority Data
Jun. 6, 2014    (JP) ................................ 2014-117808

(51) Int. Cl.
*G06F 3/0481*    (2013.01)
*G06F 3/0488*    (2013.01)
(Continued)

(52) U.S. Cl.
CPC .......... *G06F 3/04815* (2013.01); *G06F 3/005* (2013.01); *G06F 3/017* (2013.01); *G06F 3/0304* (2013.01); *G06F 3/0488* (2013.01)

(58) Field of Classification Search
None
See application file for complete search history.

(56) References Cited

U.S. PATENT DOCUMENTS 7,375,743 B2 *    5/2008    Millar .................... H04N 5/232
                                                 348/143
8,139,027 B2 *    3/2012    Kaneshige .............. A63F 13/10
                                                 345/156
(Continued)

FOREIGN PATENT DOCUMENTS

JP        2012-247976        12/2012

*Primary Examiner* — Duane N Taylor, Jr.
(74) *Attorney, Agent, or Firm* — Nixon & Vanderhye, P.C.

(57) ABSTRACT

A non-transitory storage medium encoded with a computer readable information processing program executable by a computer of an information processing apparatus, causing one or more processors to perform a region display module having, together with an object representing a virtual camera located within a virtual space, at least a part of a region representing a range within the virtual space for setting a position of the object displayed, an input acceptance module accepting an input for the displayed object, an object posture setting module setting a posture of the object based on the input to the input acceptance module, a virtual camera control module controlling the virtual camera based on the posture of the object set by the object posture setting module, and a picked-up image display module having a picked-up image displayed, which is picked up by the virtual camera controlled by the virtual camera control module.

19 Claims, 15 Drawing Sheets

(51) Int. Cl.
*G06F 3/00* (2006.01)
*G06F 3/01* (2006.01)
*G06F 3/03* (2006.01)

(56) References Cited

U.S. PATENT DOCUMENTS

| | | | | |
|---|---|---|---|---|
| 8,634,476 | B2* | 1/2014 | Tran | H04N 5/23238 |
| | | | | 375/240.26 |
| 8,964,052 | B1* | 2/2015 | Wooley | H04N 5/232 |
| | | | | 348/14.03 |
| 2009/0100462 | A1* | 4/2009 | Park | G06F 17/30849 |
| | | | | 725/38 |
| 2011/0050975 | A1* | 3/2011 | Chung | G06F 1/1624 |
| | | | | 348/333.02 |
| 2011/0285636 | A1* | 11/2011 | Howard | G06F 3/04815 |
| | | | | 345/173 |
| 2012/0229512 | A1 | 9/2012 | Hayashi et al. | |
| 2013/0091432 | A1* | 4/2013 | Shet | G08B 13/19645 |
| | | | | 715/719 |

* cited by examiner

FIG.9
(A)
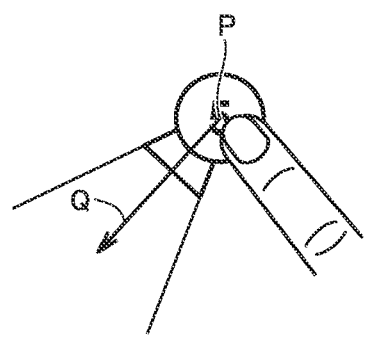
(B)
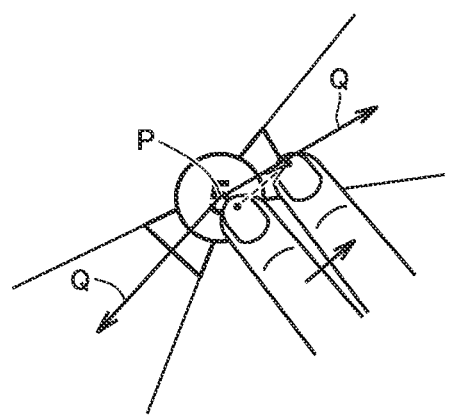

NON-TRANSITORY STORAGE MEDIUM ENCODED WITH COMPUTER READABLE INFORMATION PROCESSING PROGRAM, INFORMATION PROCESSING APPARATUS, METHOD OF CONTROLLING INFORMATION PROCESSING APPARATUS, AND INFORMATION PROCESSING SYSTEM, CAPABLE OF CONTROLLING VIRTUAL CAMERA WHILE GRASPING OVERALL CONDITION OF VIRTUAL CAMERA ARRANGED IN VIRTUAL SPACE

This nonprovisional application is based on Japanese Patent Application No. 2014-117808 filed with the Japan Patent Office on Jun. 6, 2014, the entire contents of which are hereby incorporated by reference.

FIELD

The present disclosure relates to a non-transitory storage medium encoded with a computer readable information processing program, an information processing apparatus, a method of controlling an information processing apparatus, and an information processing system, and to a method of controlling a virtual camera.

BACKGROUND AND SUMMARY

Conventionally, a virtual camera has been controlled automatically, or an orientation of a virtual camera has been controlled by providing inputs and instructions through an operation portion while information resulting from image pick-up by the virtual camera is checked.

It has been difficult, however, to control a virtual camera while an overall condition of the virtual camera arranged in a virtual space is grasped.

The present disclosure was made to solve the problems as above, and an object is to provide a non-transitory storage medium encoded with a computer readable information processing program, an information processing apparatus, a method of controlling an information processing apparatus, and an information processing system, capable of controlling a virtual camera while an overall condition of the virtual camera arranged in a virtual space is grasped.

An exemplary embodiment provides a non-transitory storage medium encoded with a computer readable information processing program executable by a computer of an information processing apparatus, causing one or more processors to perform a region display module having, together with an object representing a virtual camera located within a virtual space, at least a part of a region representing a range within the virtual space for setting a position of the object displayed, an input acceptance module accepting an input for the displayed object, an object posture setting module setting a posture of the object based on the input to the input acceptance module, a virtual camera control module controlling the virtual camera based on the posture of the object set by the object posture setting module, and a picked-up image display module having a picked-up image displayed, which is picked up by the virtual camera controlled by the virtual camera control module.

In the exemplary embodiment, the region display module has, together with the object, at least a part of an arrangement map displayed, which shows a region within the virtual space corresponding to a range in which a position of the object can be set.

In the exemplary embodiment, the object posture setting module sets the posture of the object selected based on the input accepted by the input acceptance module.

In the exemplary embodiment, the input acceptance module is implemented by a touch panel, and the object posture setting module sets the selected posture of the object based on a direction input accepted by the touch panel.

In the exemplary embodiment, an object movement control module controlling movement of the object based on the input to the input acceptance module is further provided.

In the exemplary embodiment, the object movement control module controls the posture of the object based on a direction of movement of the object in response to the input for the object to the input acceptance module.

In the exemplary embodiment, the input acceptance module is implemented by a touch panel, and a switching module switching to execution of any one of the object posture setting module and the object movement control module based on a time period during which a state of selection of the object in response to a touch input to the touch panel continues is further provided.

In the exemplary embodiment, the switching module switches to execution of the object movement control module from the object posture setting module when a time period during which the state of selection of the object in response to the touch input to the touch panel continues is equal to or longer than a prescribed period of time.

In the exemplary embodiment, the object posture setting module adjusts an orientation of the object based on an input to the input acceptance module.

In the exemplary embodiment, the object posture setting module rotates the object while a position of the object is maintained.

In the exemplary embodiment, the information processing apparatus is connected to a plurality of display devices, the region display module has one display device of the plurality of display devices provide display, and the picked-up image display module has another display device different from one display device of the plurality of display devices provide display.

In the exemplary embodiment, the region display module has a display device which can be held by a user provide display, and the picked-up image display module has a stationary display device provide display.

In the exemplary embodiment, a plurality of virtual cameras are provided, and the region display module has a plurality of objects corresponding to the plurality of virtual cameras, respectively, displayed.

In the exemplary embodiment, the picked-up image display module has the picked-up images picked by the plurality of virtual cameras, respectively, displayed.

In the exemplary embodiment, the input acceptance module accepts an input for one object of the plurality of objects, and the picked-up image display module has the picked-up image picked up by the virtual camera corresponding to the object selected in response to the input to the input acceptance module of the plurality of objects displayed in a highlighted manner as compared with picked-up images picked up by other virtual cameras corresponding to remaining objects.

In the exemplary embodiment, the picked-up image display module has the picked-up image picked up by the virtual camera corresponding to the object selected in response to the input to the input acceptance module displayed as being surrounded by picked-up images picked up by all virtual cameras.

In the exemplary embodiment, the region display module allocates a marker for identifying each of the plurality of objects and has the marker displayed, and the picked-up image display module allocates a marker corresponding to the picked up image from the virtual camera and has the marker displayed.

In the exemplary embodiment, the region display module has a marker object displayed, which is obtained by symbolizing the virtual camera.

An exemplary embodiment provides an information processing apparatus including a region display module having, together with an object representing a virtual camera located within a virtual space, at least a part of a region representing a range within the virtual space for setting a position of the object displayed, an input acceptance module accepting an input for the displayed object, an object posture setting module setting a posture of the object based on the input to the input acceptance module, a virtual camera control module controlling the virtual camera based on the posture of the object set by the object posture setting module, and a picked-up image display module having a picked-up image displayed, which is picked up by the virtual camera controlled by the virtual camera control module.

An exemplary embodiment provides a method of controlling an information processing apparatus, including the steps of displaying, together with an object representing a virtual camera located within a virtual space, at least a part of a region representing a range within the virtual space for setting a position of the object, accepting an input for the displayed object, setting a posture of the object based on the input, controlling the virtual camera based on the set posture of the object, and displaying a picked-up image picked up by the controlled virtual camera.

An exemplary embodiment provides an information processing system, including a region display module having, together with an object representing a virtual camera located within a virtual space, at least a part of a region representing a range within the virtual space for setting a position of the object displayed, an input acceptance module accepting an input for the displayed object, an object posture setting module setting a posture of the object based on the input to the input acceptance module, a virtual camera control module controlling the virtual camera based on the posture of the object set by the object posture setting module, and a picked-up image display module having a picked-up image displayed, which is picked up by the virtual camera controlled by the virtual camera control module.

According to the exemplary embodiment, a virtual camera can be controlled while an overall condition of the virtual camera in a space is grasped.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 shows an exemplary illustrative non-limiting diagram illustrating outlines of an operation instruction for posture control of a marker object according to the exemplary embodiment.

DETAILED DESCRIPTION OF NON-LIMITING EXAMPLE EMBODIMENTS

Figure 1:
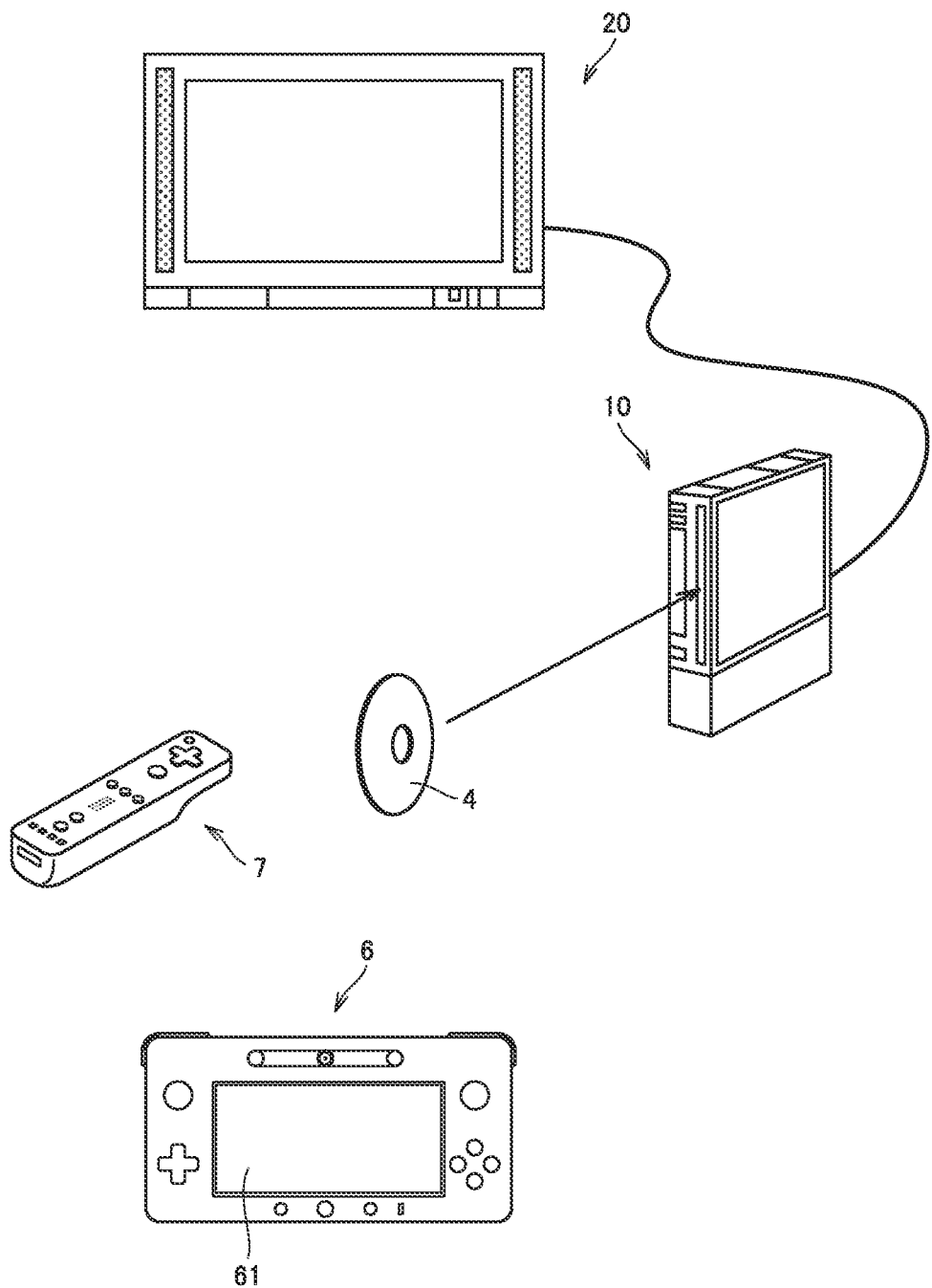
FIG. 1 shows an exemplary illustrative non-limiting diagram schematically showing a configuration of an information processing system according to an exemplary embodiment.

This embodiment will be described in detail with reference to the drawings. The same or corresponding elements in the drawings have the same reference characters allotted and description thereof will not be repeated.

<Configuration of Information Processing System>

FIG. 1 is a diagram schematically showing a configuration of an information processing system based on an embodiment.

As one embodiment, by way of example in the present example, an information processing system including an information processing apparatus 10 and a stationary display 20 will be described with reference to FIG. 1. Information processing apparatus 10 and display 20 are connected via wire. An operation terminal 6 for providing an input instruction to information processing apparatus 10 and an input controller 7 are included. Operation terminal 6 and input controller 7 supply and receive data through wireless communication to and from information processing apparatus 10.

In the present example, an optical disc 4 can be inserted in information processing apparatus 10. Optical disc 4 stores a program performing prescribed information processing. Information processing apparatus 10 performs prescribed information processing through operation terminal 6 and input controller 7 by reading and executing a program stored in the optical disc.

Though a case that information processing apparatus 10 and display 20 are connected via wire is described in the present example, wireless communication may be established therebetween, or operation terminal 6 and input controller 7 may supply and receive data through wired connection to and from information processing apparatus 10.

<Operation Terminal>

Figure 2:
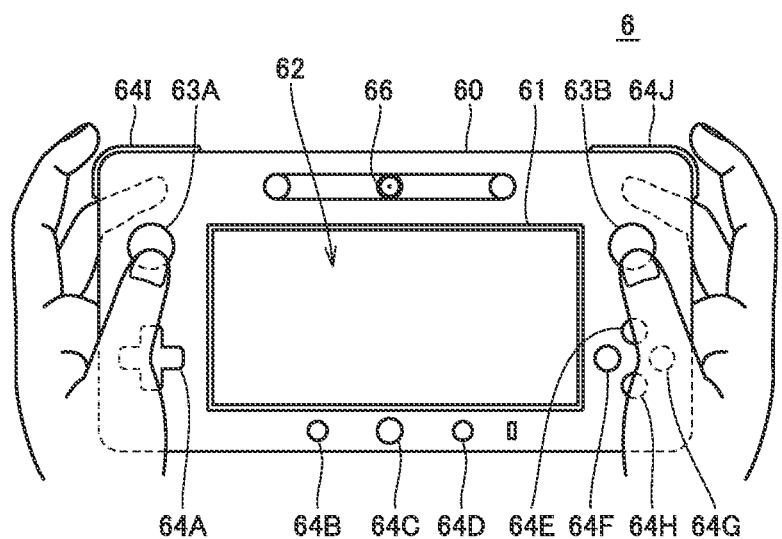
FIG. 2 shows an exemplary illustrative non-limiting diagram illustrating appearance of an operation terminal according to the exemplary embodiment.

FIG. 2 is a diagram illustrating appearance of operation terminal 6 based on the embodiment.

As shown in FIG. 2, operation terminal 6 has a housing 60 generally in a shape of a laterally long rectangular plate. Housing 60 has such a size as allowing holding by a user. Therefore, the user can move operation terminal 6 while he/she holds the operation terminal or can change a position of arrangement of operation terminal 6.

Operation terminal 6 has an LCD 61 on a surface of housing 60.

LCD 61 is provided around a center of the surface of housing 60. Therefore, the user can also hold and move operation terminal 6 while he/she views a screen on LCD 61 by holding housing 60 at opposing side portions of LCD 61.

In the present example, a user holds operation terminal 6 laterally by holding housing 60 at left and right side portions of LCD 61 (holds operation terminal 6 with a longitudinal direction being defined as a lateral direction). Operation terminal 6 can also be held vertically (operation terminal 6 is held with the longitudinal direction being defined as a vertical direction).

Operation terminal 6 has a touch panel 62 on the screen of LCD 61 as operation means. In the present embodiment, touch panel 62 is a touch panel of a resistive film type. Touch panel 62 is not limited to the resistive film type, and a touch panel of any type such as a capacitance type can be employed. Touch panel 62 may be of a single touch type or a multiple touch type. In the present embodiment, a touch panel equal in resolution to LCD 61 (detection accuracy) is made use of as touch panel 62. Touch panel 62, however, does not necessarily have to be equal in resolution to LCD 61. An input to touch panel 62 is usually provided by using a touch pen, however, an input can also be provided onto touch panel 62 with a finger of a user, without limited to the touch pen. Housing 60 may be provided with an accommodation recess for accommodating a touch pen used for operating touch panel 62. Thus, since operation terminal 6 has touch panel 62, the user can operate touch panel 62 while he/she moves operation terminal 6. Namely, the user can provide a direct input onto the screen of LCD 61 (through touch panel 62) while he/she moves the screen.

Operation terminal 6 includes, as operation means, two analog sticks 63A and 63B and a plurality of operation buttons 64A to 64J. Each of analog sticks 63A and 63B is a device indicating a direction. Each of analog sticks 63A and 63B is constructed such that a stick portion operated by a finger of the user can be slid or tilted in any direction with respect to the surface of housing 60 (any angle in up, down, left, right, and diagonal directions). Analog stick 63A is provided on the left of the screen on LCD 61 and analog stick 63B is provided on the right of the screen on LCD 61. Therefore, the user can provide an input indicating a direction with any of his/her left and right hands, by using analog stick 63A or 63B. Since each of analog sticks 63A and 63B is provided at a position allowing an operation while the user holds left and right portions of operation terminal 6, the user can readily operate each of analog sticks 63A and 63B also when he/she holds and moves operation terminal 6.

Each of operation buttons 64A to 64J is operation means for providing a prescribed input. As shown below, each of operation buttons 64A to 64J is provided at a position allowing an operation while the user holds left and right portions of operation terminal 6. Therefore, the user can readily operate such operation means also when he/she holds and moves operation terminal 6.

A cross-shaped button (direction input button) 64A and operation buttons 64B to 64H of operation buttons 64A to 64J are provided on the surface of housing 60. Operation buttons 64A to 64H are arranged at positions allowing an operation with a thumb of a user.

Cross-shaped button 64A is provided on the left of LCD 61, under analog stick 63A. Namely, cross-shaped button 64A is arranged at a position allowing an operation with a left hand of a user. Cross-shaped button 64A is a button having a cross shape and being capable of indicating up, down, left, and right directions. Operation buttons 64B to 64D are provided under LCD 61. These three operation buttons 64B to 64D are arranged at positions allowing an operation with both of left and right hands. Four operation buttons 64E to 64H are provided on the right of LCD 61, under analog stick 63B. Namely, four operation buttons 64E to 64H are arranged at positions allowing an operation with a right hand of a user. Four operation buttons 64E to 64H are arranged to satisfy up, down, left, and right positional relation (with respect to a central position of four operation buttons 64E to 64H). Therefore, operation terminal 6 can also allow four operation buttons 64E to 64H to function as buttons for having a user indicate up, down, left, and right directions.

A function in accordance with a program performing prescribed information processing is allocated as appropriate to each of operation buttons 64A to 64J. For example, cross-shaped button 64A and operation buttons 64E to 64H may be used for a direction instruction operation or a selection operation, and each of operation buttons 64B to 64D may be used for an enter operation or a cancellation operation.

Though not shown, operation terminal 6 has a power button for turning on/off power of operation terminal 6. Operation terminal 6 may have an operation button for turning on/off display on the screen on LCD 61, an operation button for setting connection (pairing) with information processing apparatus 10, or an operation button for adjusting a sound volume of a speaker.

Operation terminal 6 has a built-in camera 66 serving as image pick-up means. Built-in camera 66 includes an image pick-up device having prescribed resolution (such as a CCD image sensor or a CMOS image sensor) and a lens. For example, built-in camera 66 is provided on the surface of housing 60. Therefore, built-in camera 66 can pick up an image of a face of a user holding operation terminal 6.

<Configuration of Information Processing Apparatus>

Figure 3:
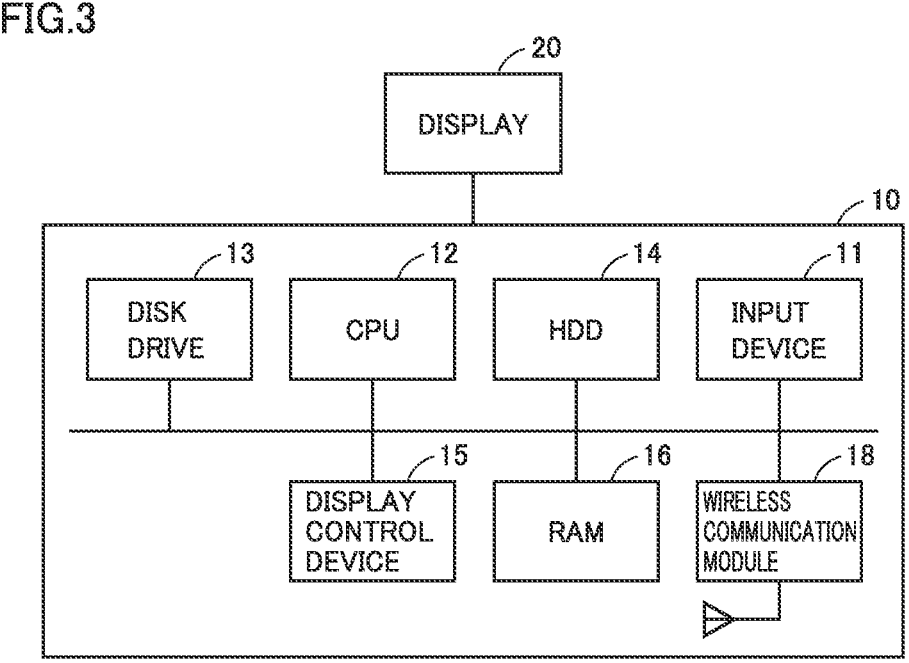
FIG. 3 shows an exemplary illustrative non-limiting diagram illustrating a hardware configuration of an information processing apparatus according to the exemplary embodiment.

FIG. 3 is a diagram illustrating a hardware configuration of information processing apparatus 10 based on the embodiment.

As shown in FIG. 3, information processing apparatus 10 includes an input device 11, a central processing unit (CPU) 12, a disk drive 13, a hard disk drive (HDD) 14, a display control device 15, a random access memory (RAM) 16, and a wireless communication module 18.

Disk drive 13 drives inserted optical disc 4, reads a program stored in optical disc 4, and outputs the program to CPU 12.

Input device 11 is operated by a user of information processing apparatus 10 and outputs a signal in response to an operation by the user to CPU 12. Input device 11 accepts an input instruction, for example, resulting from an operation of operation terminal 6 or input controller 7 by the user through wireless communication module 18.

Display control device 15 generates an image for display on display 20 in response to an instruction from CPU 12 and has display 20 output and display the image.

CPU 12 is operation processing means for executing a computer program.

HDD 14 stores a system program to be executed by CPU 12. The system program executed by CPU 12 may be recorded in advance or may be obtained from other devices through communication with other devices. A read only memory (ROM) may also be applicable without limited to HDD 14.

RAM 16 temporarily stores a computer program or information as a working memory. By way of example, a pseudo-SRAM (PSRAM) can be employed as RAM 16.

Wireless communication module 18 transmits and receives a signal (data) to and from operation terminal 6 or input controller 7 through wireless communication.

<Configuration of Operation Terminal>

Figure 4:
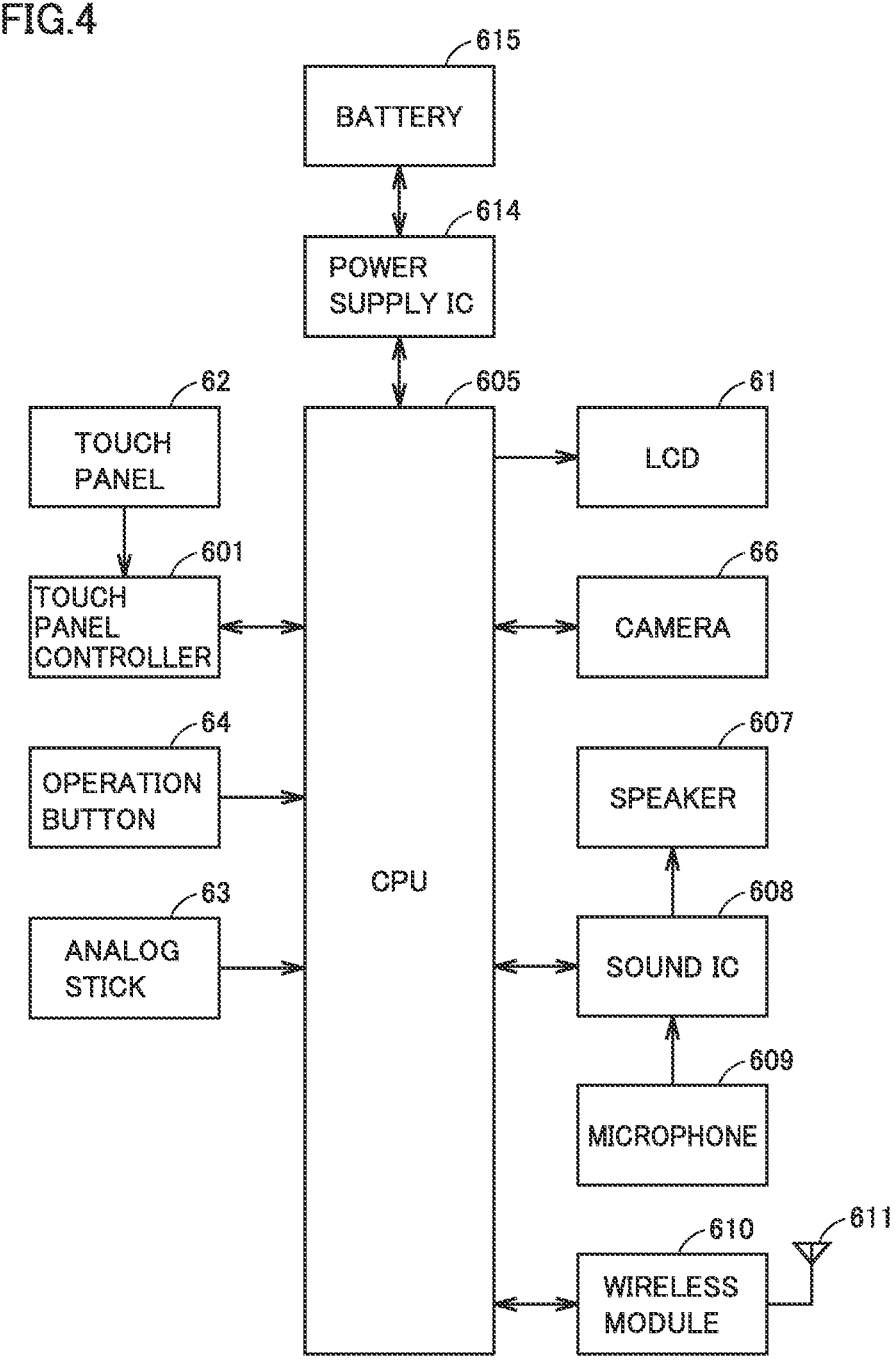
FIG. 4 shows an exemplary illustrative non-limiting diagram illustrating a hardware configuration of the operation terminal according to the exemplary embodiment.

FIG. 4 is a diagram illustrating a hardware configuration of operation terminal 6 based on the embodiment.

As shown in FIG. 4, operation terminal 6 includes, in addition to the features shown in FIG. 2, a touch panel controller 601, a CPU 605, a speaker 607, a sound IC 608, a microphone 609, a wireless module 610, an antenna 611, a power supply IC 614, and a battery 615. These electronic components are accommodated in housing 60 as being mounted on an electronic circuit board.

CPU 605 is a circuit for controlling input and output of data to and from various input and output portions. CPU 605 is connected to touch panel controller 601, analog stick 63 (analog sticks 63A and 63B), operation button 64 (each of operation buttons 64A to 64J) as well as to LCD 61, built-in camera 66, sound IC 608, and wireless module 610.

Power supply IC 614 is connected to CPU 605, so that power is supplied to each component. Built-in battery 615 is connected to power supply IC 614, so that power is supplied. Operation terminal 6 may be charged by attaching operation terminal 6 to a not-shown cradle having a charging function.

Touch panel controller 601 is a circuit connected to touch panel 62 for controlling touch panel 62. Touch panel controller 601 generates touch position data in a prescribed format based on a signal from touch panel 62 and outputs the data to CPU 605. The touch position data represents a coordinate of a position where input has been provided onto an input surface of touch panel 62. Touch panel controller 601 reads a signal from touch panel 62 and generates touch position data once in a prescribed period of time.

Analog stick 63 outputs to CPU 605, stick data representing a direction and an amount of tilt of the stick portion operated by a finger of a user. Operation button 64 outputs to CPU 605, operation button data representing a status of input to each of operation buttons 64A to 64J (whether or not a button was pressed).

CPU 605 transmits touch position data, stick data, and operation data including operation button data received from components above to information processing apparatus 10, and receives data transmitted from information processing apparatus 10 and outputs a control instruction to each component.

Built-in camera 66 picks up an image in response to an instruction from information processing apparatus 10 and outputs data of the picked-up image to CPU 605. CPU 605 outputs to built-in camera 66, a control instruction for built-in camera 66 such as an instruction to pick up an image. Built-in camera 66 can also shoot moving images. Namely, built-in camera 66 can also pick up images repeatedly and output repeatedly image data to CPU 605.

Sound IC 608 is a circuit connected to speaker 607 and microphone 609 for controlling input and output of audio data to and from speaker 607 and microphone 609. Namely, when audio data is received from CPU 605, sound IC 608 outputs to speaker 607, an audio signal obtained through D/A conversion of the audio data so as to have speaker 607 output sound. Microphone 609 senses sound (voice and sound from a user) transmitted to operation terminal 6 and outputs to sound IC 608, an audio signal representing the sound. Sound IC 608 subjects the audio signal from microphone 609 to A/D conversion and outputs audio data in a prescribed format to CPU 605.

CPU 605 transmits, as terminal operation data, image data from built-in camera 66, audio data from microphone 609, and operation data to information processing apparatus 10 through wireless module 610. CPU 605 subjects the terminal operation data to known compression processing for decrease in amount of data, and outputs compressed transmission data to wireless module 610.

Antenna 611 is connected to wireless module 610, and wireless module 610 transmits the data to information processing apparatus 10 through antenna 611. Wireless module 610 is similar in function to wireless communication module 18 of information processing apparatus 10. Namely, wireless module 610 has a function for connection to wireless LAN with a scheme in conformity, for example, with IEEE 802.11n specifications. Data transmitted from wireless module 610 may or may not be encrypted as necessary.

As above, transmission data transmitted from operation terminal 6 to information processing apparatus 10 can include operation data (terminal operation data), image data, and audio data, however, it may consist only of operation data (terminal operation data).

Compressed image data and audio data are transmitted from information processing apparatus 10 to operation terminal 6. Such data is received by CPU 605 through antenna 611 and wireless module 610. Then, CPU 605 decompresses the received image data and audio data. The decompressed image data is output to LCD 61 so that LCD 61 displays an image in accordance with the image data. The decompressed audio data is output to sound IC 608 so that speaker 607 outputs sound in accordance with the audio data.

When data received from information processing apparatus 10 includes control data, a control instruction in accordance with the control data is given to each component.

As above, though operation terminal 6 includes such operation means as touch panel 62, analog stick 63, and operation button 64, in other embodiments, instead of or together with such operation means, other operation means may be included. For example, a sensor for calculating motion (a position, a posture, or change in position or posture) (a magnetic sensor, an acceleration sensor, or a gyro sensor) may be provided and operation means making use of the motion may be provided.

<Outlines of Game Processing>

Game processing based on the embodiment will be described below. In the game processing according to the present embodiment, a plurality of surveillance cameras provided in a game space are controlled, a monitored object which is to be monitored and present and moving in the game space in accordance with information resulting from image pick-up by a plurality of cameras is sensed, and the sensed monitored object is subjected to prescribed processing.

Figure 5:
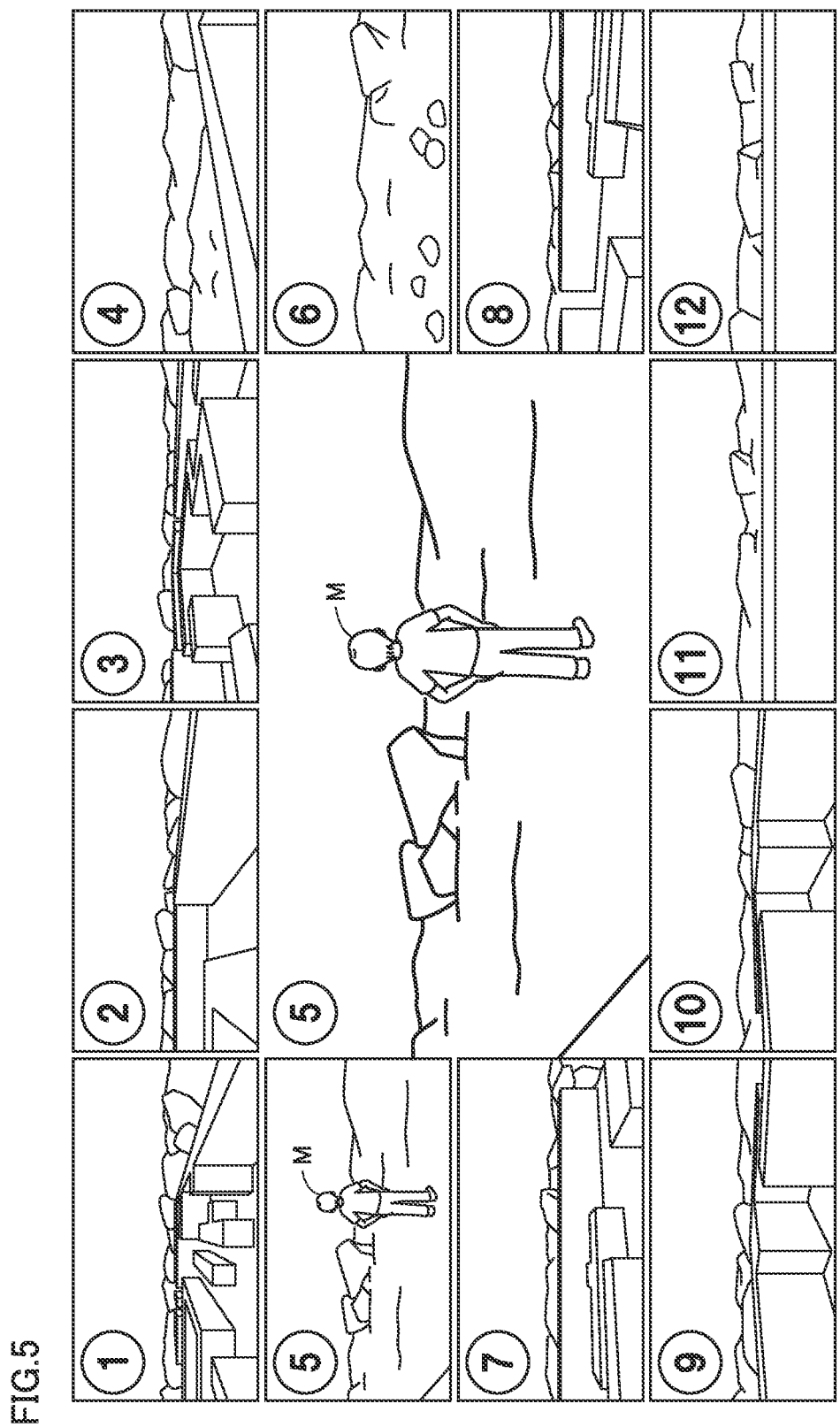
FIG. 5 shows an exemplary illustrative non-limiting diagram illustrating one example of a screen in game processing displayed on a display according to the exemplary embodiment.

FIG. 5 is a diagram illustrating one example of a screen of game processing displayed on display 20 based on the embodiment.

FIG. 5 shows a split screen including a plurality of screens resulting from image pick-up by a plurality of surveillance cameras provided in a game space. By way of example, a 13-split screen is displayed.

Specifically, one large screen is displayed in a central region of display 20. Then, 12 small screens are displayed around the central region. The large screen corresponds to an area of four small screens.

In the present example, the plurality of surveillance cameras are numbered for identification, and information resulting from image pick-up of the game space from each numbered surveillance camera is displayed.

By way of example, information resulting from image pick-up by 12 surveillance cameras numbered as Nos. 1 to 12 is displayed. Though a case that the surveillance cameras are identified as being numbered with numeric characters is described by way of example, limitation thereto is not particularly intended, and identification may be made by using, for example, such alphabets as A, B, and C, or identification may be made by using a mark or a color. Information for identification does not have to always be displayed, and it may be displayed in response to an instruction from a user or displayed depending on a condition (development of a game).

Images in the small screens Nos. 1 to 12 are displayed on an outer periphery within the screen of display 20, and the image on the small screen No. 5 is displayed on the central large screen as being increased in size. Namely, the small screen No. 5 is displayed in a highlighted manner. Though an example in which highlighted display is provided in accordance with a ratio of an area by setting the large screen to have an area of four small screens is described in the present example, limitation thereto is not particularly intended and any form may be applicable so long as highlighted display is given. For example, only the screen in the central region may be displayed in colors and others may be displayed in monochrome, or a symbol mark indicating highlighted display may be provided. Highlighted display by means of such a visual effect as blinking can also be provided.

An image from a selected surveillance camera may be displayed in a highlighted manner on the 12-split screen on display 20 without providing a central region.

When a plurality of display devices are provided, display contents may be split for each display device. For example, when 24 surveillance cameras are provided and numbered as Nos. 1 to 24, images from 12 surveillance cameras numbered as Nos. 1 to 12 may be displayed on one display device of the plurality of display devices, images from the surveillance cameras numbered as Nos. 13 to 24 may be displayed on another display device, and an image from one surveillance camera may be displayed in a highlighted manner on each display device.

Here, a moving monitored object M present in the game space is displayed on the screen No. 5, and the user subjects monitored object M to prescribed processing.

By displaying 12 small screens in a tiled manner around the central region, the plurality of small screens can readily be grasped in accordance with given numbers.

Figure 6:
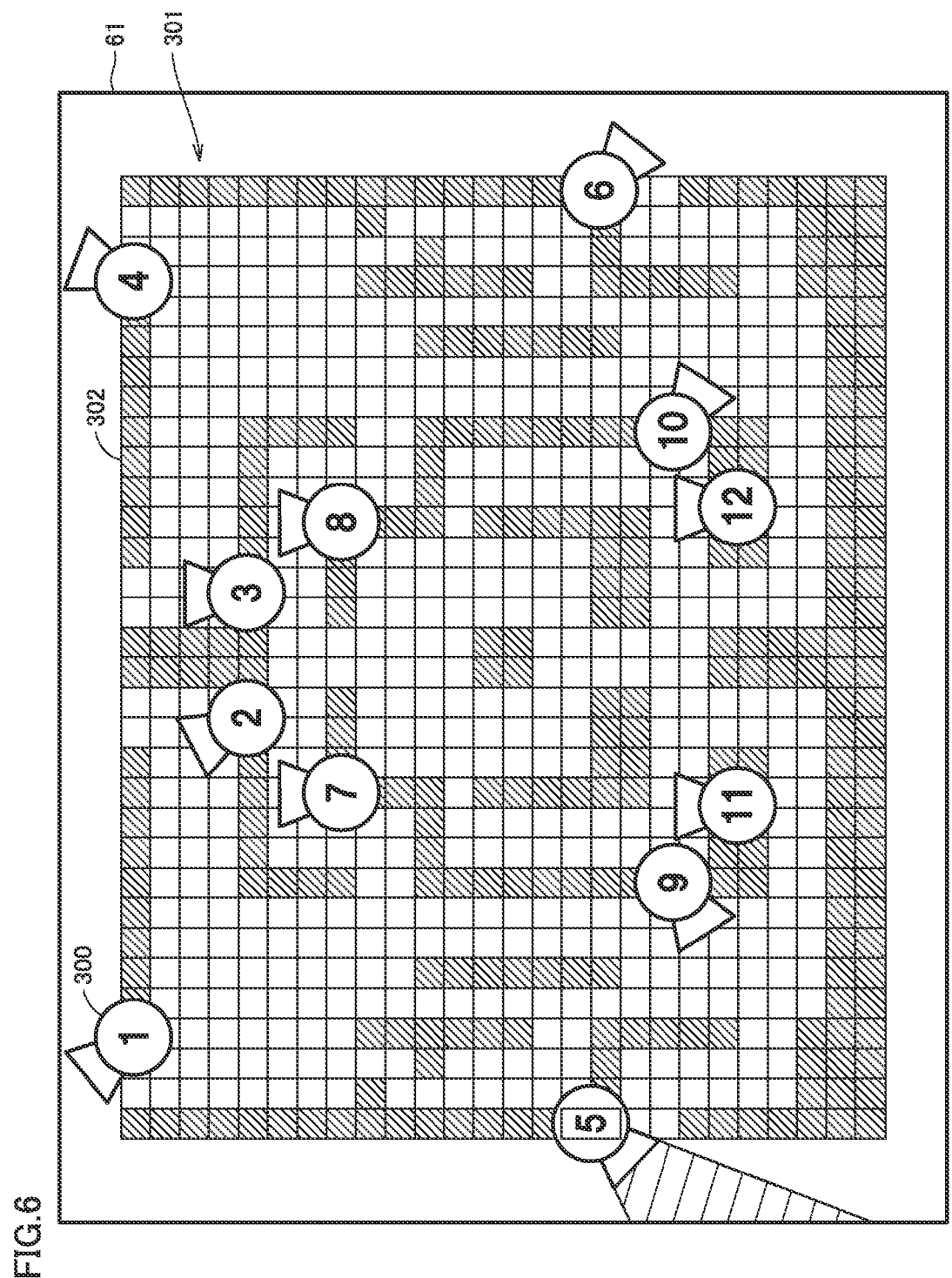
FIG. 6 shows an exemplary illustrative non-limiting diagram illustrating an arrangement map shown on an LCD of the operation terminal according to the exemplary embodiment.

FIG. 6 is a diagram illustrating an arrangement map 301 shown on LCD 61 of operation terminal 6 based on the embodiment.

As shown in FIG. 6, a region representing a range in a virtual space for setting a position of an object is displayed on LCD 61. Specifically, arrangement map 301 is displayed as the region. The arrangement map is a map representing a region where 12 surveillance cameras can be arranged. Though a case that the entire region where 12 surveillance cameras can be arranged is displayed on LCD 61 is described in the present example, limitation thereto is not particularly limited and at least a partial region of arrangement map 301 may be displayed on LCD 61.

Arrangement map 301 is provided with 12 marker objects (hereinafter also referred to as a marker) obtained by symbolizing 12 surveillance cameras. A number corresponding to a number allocated to a surveillance camera is given for each marker object 300. The number of marker object 300 and the screen number shown in FIG. 5 are the number allocated to the same surveillance camera. Marker object 300 is shown as combination of a circle in which a number is displayed with a trapezoidal graphic provided outside the circle. A direction of provision of the trapezoidal graphic from the center of the circle is shown as an orientation of the marker (a direction of a line of sight).

Marker 300 is movably provided, and a plurality of movement-allowed regions 302 where marker 300 can move are provided in arrangement map 301. Then, 12 markers 300 are arranged in the plurality of movement-allowed regions 302, respectively.

A posture of marker 300 is controllable. In the present example, an orientation of marker 300 (a direction of a line of sight) is controlled as a posture of marker 300.

Then, the surveillance camera is controlled based on a posture of marker 300. Specifically, an orientation of the surveillance camera is controlled in accordance with an orientation (a direction of a line of sight) of marker 300. In the present example, by way of example, a posture and a position of marker 300 are controlled by providing an input operation onto touch panel 62.

In the present example, No. 5 marker 300 has been selected and a hatched area displaying a range of a field of view in accordance with an orientation of No. 5 marker 300 is shown. In order to show the selected state, a number "5" is surrounded by a rectangle. The selected state may be shown by changing a color of a number or increasing a size of a marker object. By providing an input for a marker object shown on arrangement map 301, the surveillance camera can be controlled while an overall condition of cameras in the space is grasped. By displaying a marker object obtained by symbolizing a surveillance camera, an operation onto the screen can be facilitated. Specifically, since an orientation of a marker object corresponding to an orientation of a surveillance camera is shown in arrangement map 301 together with marker objects corresponding to 12 surveillance cameras, by providing an input operation for a desired marker object through touch panel 62, a corresponding surveillance camera can readily be operated.

Though all markers 300 shown in FIG. 6 can be controlled through touch panel 62, surveillance cameras can also be controlled with means other than touch panel 62. In the present example, a surveillance camera in the selected state can be controlled by providing an input operation to analog stick 63. In the present example, a posture of a surveillance camera corresponding to marker 300 (No. 5 in the present example) in the selected state can be controlled. Specifically, an orientation of a surveillance camera (a direction of a line of sight) can be controlled in a direction of tilt of the stick portion of analog stick 63 operated with a finger of a user. For example, tilt upward changes an orientation of a surveillance camera upward. Tilt downward changes an orientation of a surveillance camera downward. Tilt to left and right can change an orientation of a surveillance camera to left and right.

Figure 7:
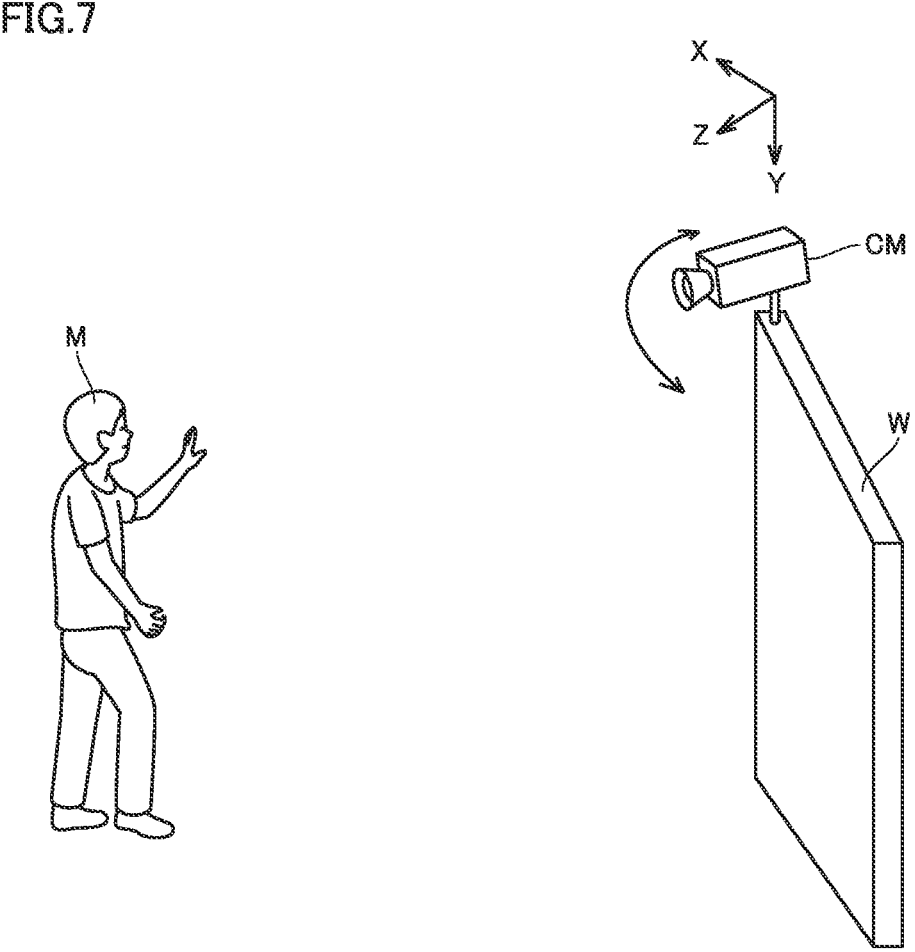
FIG. 7 shows an exemplary illustrative non-limiting diagram illustrating control of a surveillance camera according to the exemplary embodiment.

FIG. 7 is a diagram illustrating control of a surveillance camera based on the embodiment.

FIG. 7 shows a case that a surveillance camera object CM is arranged with respect to a wall object W provided in the game space. In the present example, though surveillance camera object CM corresponding to the surveillance camera is arranged in the game space while it can be displayed on the screen, surveillance camera object CM may not be displayed on the screen when the surveillance camera is virtually arranged in the game space.

Wall object W is arranged on an XZ plane defined by X, Y, and Z axes defining the game space. Surveillance camera object CM is arranged above wall object W.

Moving monitored object M present in the game space is also provided.

A direction of a line of sight of surveillance camera object CM is set as being inclined downward (a direction of the Y axis). A prescribed angle of depression is set, with the XZ plane being defined as the reference.

In the present example, a posture and a position of surveillance camera object CM can be controlled in accordance with an operation input for marker 300 shown together with arrangement map 301. Specifically, an orientation (a direction of a line of sight) of the surveillance camera object can be controlled as a posture of surveillance camera object CM, based on an operation input to touch panel 62. Control of an orientation (a direction of a line of sight) of the surveillance camera object changes an orientation (a direction of a line of sight) with a position being fixed. The X axis and the Z axis are changed, with a coordinate on the Y axis of a parameter of an orientation (a direction of a line of sight) (a coordinate on the X axis, the Y axis, and the Z axis) being fixed. An orientation (a direction of a line of sight) is changed in a horizontal direction with the X-Z axes being defined as the horizontal plane.

A coordinate of a position of surveillance camera object CM can be controlled.

A surveillance camera can also be controlled with means other than touch panel 62 as described above. Tilt of the stick portion of analog stick 63 to left and right changes an orientation of a surveillance camera in the horizontal direction with the X-Z axes being defined as the horizontal plane. Tilt upward and downward changes an orientation of a surveillance camera in the direction of the Y axis.

<Functional Block Diagram>

Figure 8:
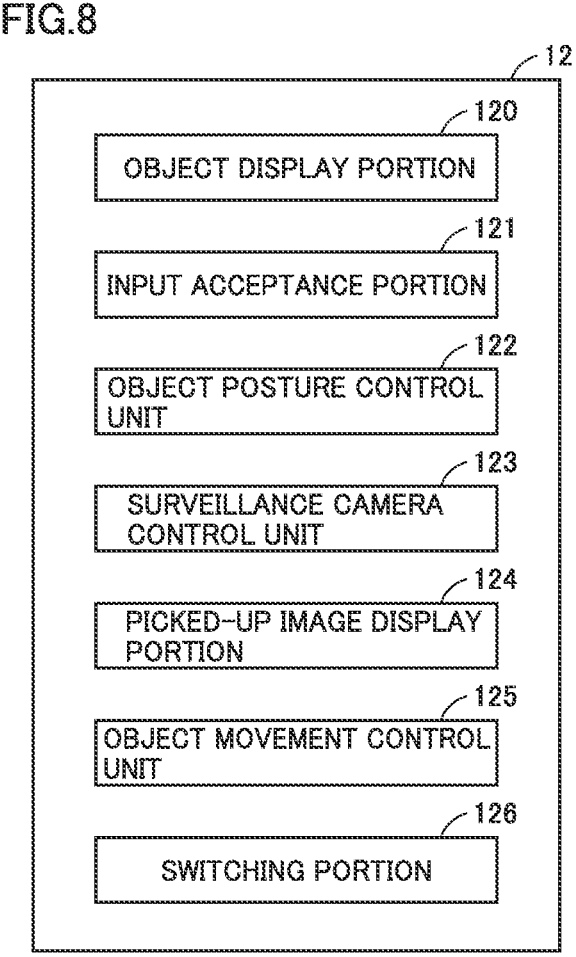
FIG. 8 shows an exemplary illustrative non-limiting functional block diagram of the information processing apparatus according to the exemplary embodiment.

FIG. 8 is a functional block diagram of information processing apparatus 10 based on the embodiment.

As shown in FIG. 8, in the present example, various functional blocks (modules) are implemented as a result of execution of a program by CPU 12.

Specifically, an object display portion 120, an input acceptance portion 121, an object posture control unit 122, a surveillance camera control unit 123, a picked-up image display portion 124, an object movement control unit 125, and a switching portion 126 are included.

Object display portion 120 generates data for having LCD 61 of operation terminal 6 display, together with a marker object showing arrangement of a surveillance camera, at least a part of the arrangement map showing a region where a marker object can be arranged, and transmits the generated data to operation terminal 6 through wireless communication module 18. Operation terminal 6 receives the data through wireless module 610. Then, operation terminal 6 displays the received data on LCD 61. Through such processing, the arrangement map described, for example, with reference to FIG. 6 is displayed on LCD 61 of operation terminal 6.

Input acceptance portion 121 accepts terminal operation data from a user and receives the terminal operation data transmitted from wireless module 610 of operation terminal 6 through wireless communication module 18. Then, input acceptance portion 121 accepts the terminal operation data through wireless communication module 18.

Object posture control unit 122 controls a posture of a marker object based on the terminal operation data from the user.

Object movement control unit 125 controls movement of a marker object based on the terminal operation data from the user.

Switching portion 126 switches to control by any one of object posture control unit 122 and object movement control unit 125 when the terminal operation data from the user satisfies a prescribed condition.

Surveillance camera control unit 123 controls a posture or a position of a surveillance camera in accordance with a posture of a marker object controlled by object posture control unit 122 or a position of a marker object moved by object movement control unit 125.

Picked-up image display portion 124 generates data for display on display 20, based on an image picked up by a surveillance camera in the game space. Picked-up image display portion 124 outputs the generated data to display control device 15. Display control device 15 has display 20 display a picked up image in accordance with the data generated by picked-up image display portion 124. In the present example, the 13-split screen described with reference to FIG. 5 is displayed on display 20.

<Description of Instruction of Operation>

FIG. 9 is a diagram illustrating outlines of an operation instruction for posture control for a marker object based on the embodiment.

As shown in FIG. 9 (A), in the present example, selection of the marker No. 5 is shown. Specifically, by touching the marker No. 5 (within a circular region of the marker), the marker No. 5 is selected. Thus, in the central region of display 20, an image picked up by the surveillance camera No. 5 is displayed as being increased in size. By similarly touching also a marker numbered otherwise, a marker having a corresponding number is selected and an image picked up by a surveillance camera corresponding to the selected marker is displayed as being increased in size in the central region.

Here, a coordinate of the center of the marker is shown as a central coordinate P of a circle, and an orientation (a direction of a line of sight) of the marker is shown as a direction Q. Central coordinate P and direction Q are used for the sake of convenience of illustration.

As shown in FIG. 9 (B), in the present example, a posture of the marker No. 5 is controlled. In the present example, the marker No. 5 is selected and an orientation thereof is changed.

Specifically, when a position of touch input is changed to the outside of the circle of the marker while the touch input continues from the position of the touch input for selection of the marker, a posture of the marker is controlled.

Therefore, even when a position of touch input is changed within the circle of the marker from the position of touch input for selection of the marker, a posture of the marker is not changed.

When a position of touch input is changed to the outside of the circle of the marker, a posture of the marker is controlled such that a direction connecting central coordinate P of the marker to the outside position of the touch input is set as the orientation (the direction of a line of sight) of the marker. In this case, an orientation (a direction of a line of sight) is controlled by rotating the marker with the central coordinate of the marker being defined as the fulcrum.

Furthermore, when change from a position of the touch input to another position of touch input is made, a posture of the marker is controlled such that a direction connecting central coordinate P of the marker to the resultant position of touch input is set as the orientation (the direction of a line of sight) of the marker.

With such control, an orientation of a surveillance camera is controlled in accordance with an orientation (a direction of a line of sight) of the marker. Thus, a picked-up image corresponding to No. 5 on display 20 is changed.

Figure 10:
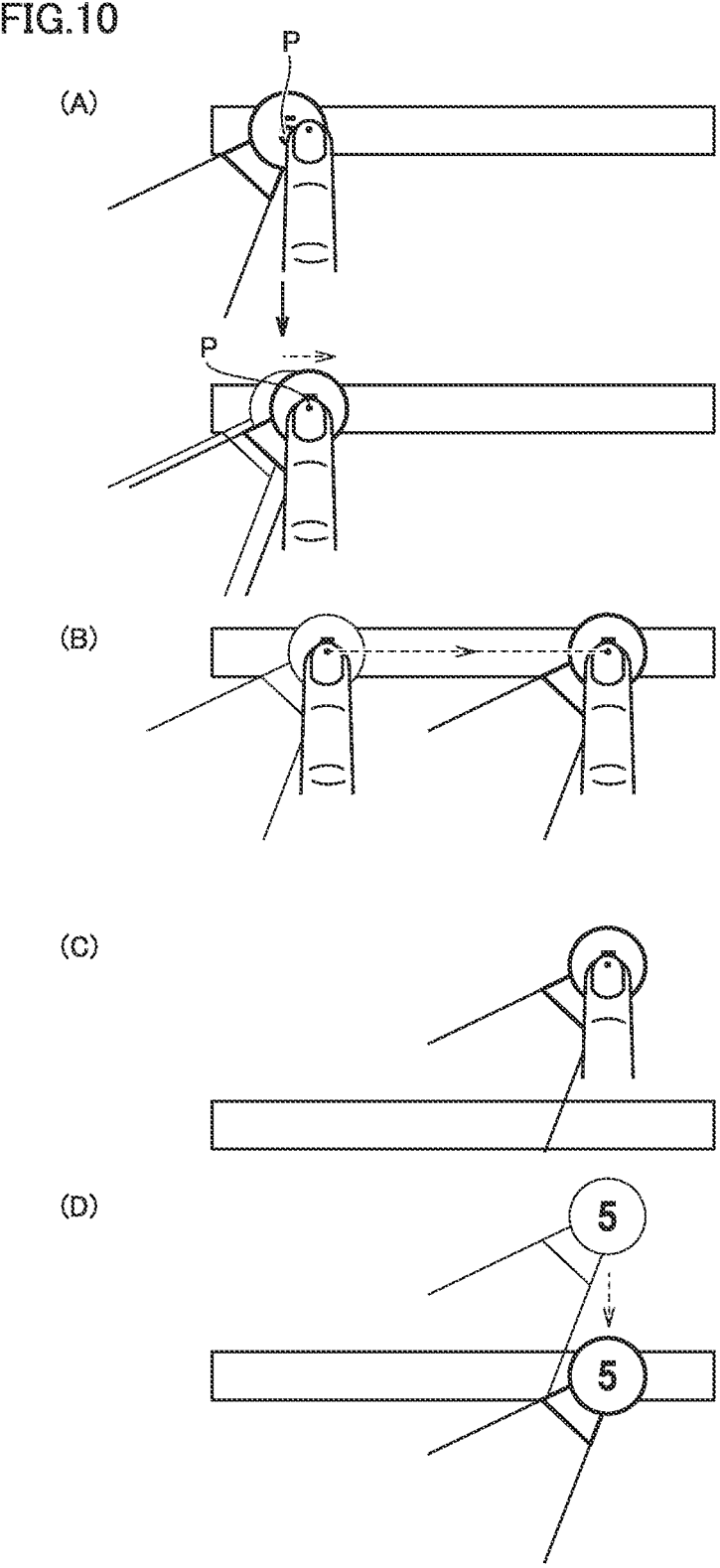
FIG. 10 shows an exemplary illustrative non-limiting diagram illustrating outlines of an operation instruction for movement control of a marker object according to the exemplary embodiment.

FIG. 10 is a diagram illustrating outlines of an operation instruction for movement control for a marker object based on the embodiment.

As shown in FIG. 10 (A), when touch input has continued for a prescribed period of time at a position of touch input for selection of a marker, switch from posture control for the marker to movement control processing is made.

With movement control, a marker moves as following positions of touch input. Specifically, movement of the marker is controlled such that central coordinate P of the marker is superimposed on a position of the touch input. When switch to movement control is made, the marker moves as following positions of touch input, and hence movement can be controlled with such feeling as the marker sticking to a finger.

Switch in control may visually be informed by changing a manner of display of a marker such as increase in size of the marker or change in color of the marker at the time of switch to movement control.

Without being limited to switch from posture control for a marker to movement control processing when touch input has continued for a prescribed period of time at a position of touch input for selection of the marker, processing may be switched, for example, when touch input within a prescribed range (within a circle of the marker) has continued for a prescribed period of time.

As shown in FIG. 10 (B), movement of a marker is controlled as following positions of touch input. A state before movement control of the marker is maintained as the posture of the marker.

As shown in FIG. 10 (C), since movement of a marker is controlled as following positions of touch input, the marker can be moved to any position in accordance with a position of touch input. Therefore, when touch input has continued, the marker temporarily moves to a position which is not in movement-allowed region 302.

Movement, however, is allowed only within movement-allowed region 302. Therefore, when touch input has ended (also referred to as touch off), automatic movement control is carried out.

FIG. 10 (D) shows touch off from a marker at a position which is not within movement-allowed region 302. In that case, the marker is controlled to move to movement-allowed region 302 shortest in distance from the touch off position.

With such control, a position of a surveillance camera is controlled in accordance with movement of a marker. Thus, a picked-up image corresponding to No. 5 on display 20 is changed.

<Outlines of Information Processing>

Figure 11:
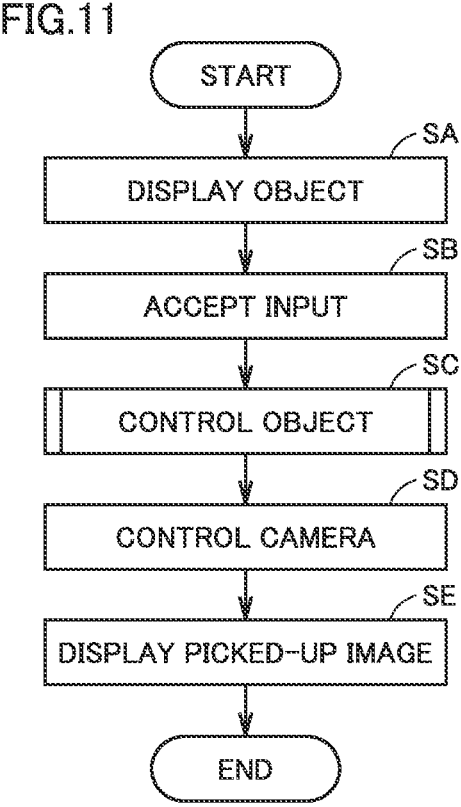
FIG. 11 shows an exemplary illustrative non-limiting flowchart illustrating outlines of information processing according to the exemplary embodiment.

FIG. 11 is a flowchart illustrating outlines of information processing based on the embodiment. The processing is mainly performed by each functional block implemented by CPU 12.

As shown in FIG. 11, an object is displayed (step SA).

Object display portion 120 generates data for having LCD 61 of operation terminal 6 display, together with a marker object showing arrangement of a surveillance camera, at least a part of the arrangement map showing a region where the marker object can be arranged, and transmits the generated data to operation terminal 6 through wireless communication module 18. Operation terminal 6 receives the data through wireless module 610. Then, operation terminal 6 displays the received data on LCD 61.

Then, an input for the marker object is accepted (step SB).

Input acceptance portion 121 accepts terminal operation data from a user. Specifically, the terminal operation data transmitted from wireless module 610 of operation terminal 6 is received through wireless communication module 18. Then, the terminal operation data is accepted through wireless communication module 18.

Then, the object is controlled (step SC). In the present example, a posture or a position of the marker object is changed based on the terminal operation data from the user which has been accepted by input acceptance portion 121. For example, object posture control unit 122 controls an orientation (a posture) of the marker object based on the terminal operation data. Object movement control unit 125 controls a position of the marker object based on the terminal operation data. Switching portion 126 switches processing between object posture control unit 122 and object movement control unit 125 based on an input instruction for the terminal operation data from the user.

Details of object control processing for controlling an object will be described later.

Then, a surveillance camera is controlled (step SD). Surveillance camera control unit 123 controls a corresponding surveillance camera object provided in the game space, based on a posture and a position of the marker object. An orientation (a direction of a line of sight) of the surveillance camera object is changed in the game space and a position of the surveillance camera object is changed.

Then, a picked-up image is displayed (step SE). Picked-up image display portion 124 generates data for display on display 20 of an image picked up at the time when a virtual camera is arranged in a position and a posture of each surveillance camera object in the game space. Then, display control device 15 has display 20 provide split display of the image based on the data generated by picked-up image display portion 124.

Then, the process ends (end).

A series of processing is repeated once in a prescribed period of time (for example, 1/60 second) (1 cycle). When a posture and a position of a marker object are changed, an object is displayed based on the resultant posture and position.

<Object Control Processing>

Figure 12:
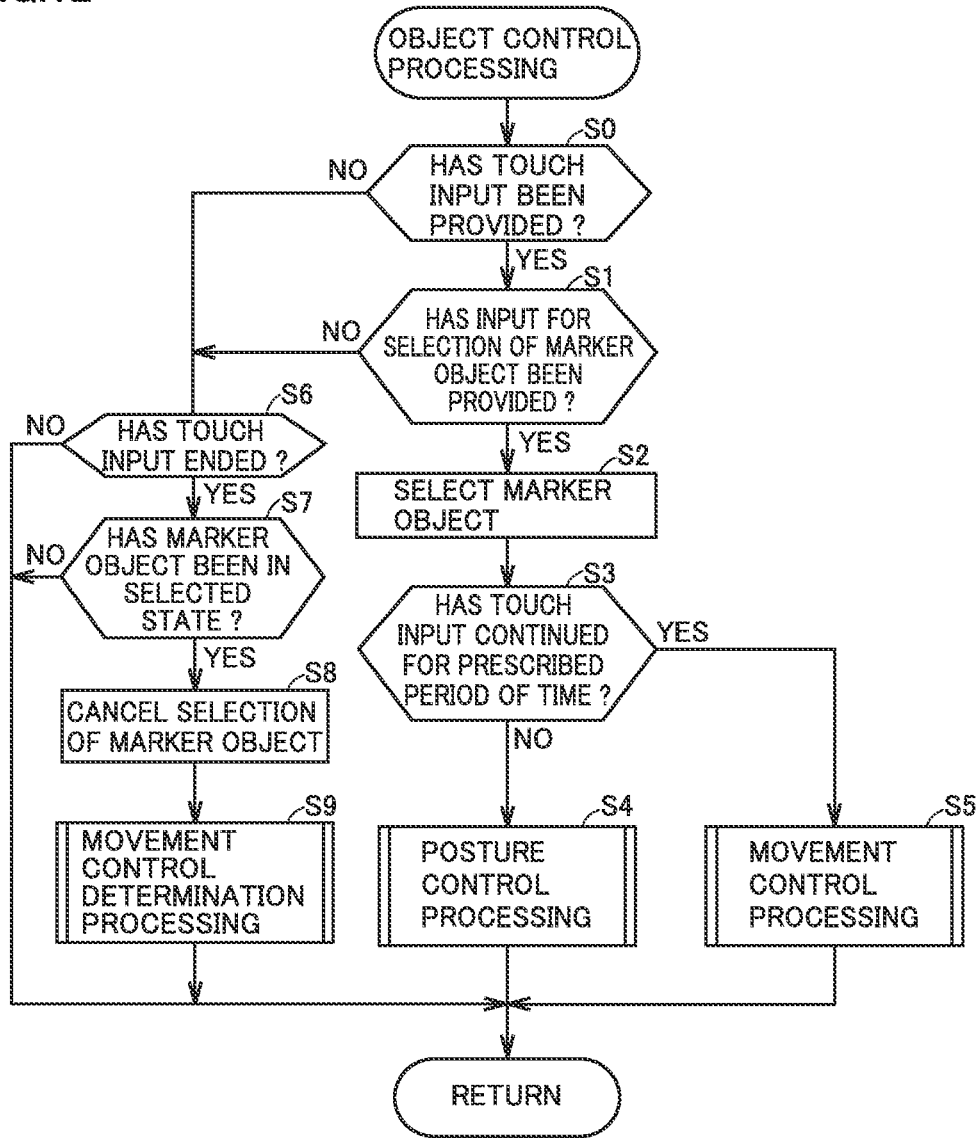
FIG. 12 shows an exemplary illustrative non-limiting diagram illustrating a flow of object control processing according to the exemplary embodiment.

FIG. 12 is a diagram illustrating a flow of object control processing based on the embodiment.

As shown in FIG. 12, input acceptance portion 121 determines whether or not a touch input has been provided (step S0). Specifically, whether or not an operation input onto touch panel 62 (touch position data) has been accepted is determined.

Then, when input acceptance portion 121 determines that a touch input has been provided (YES in step S0), it determines whether or not an input for selection of a marker object has been provided (step S1). Specifically, whether or not an operation input onto touch panel 62 is an operation input within a range of a circle where a marker object shown on LCD 61 is drawn is determined.

Then, when input acceptance portion 121 determines in step S1 that an input for selection of a marker object is provided (YES in step S1), the marker object is set to a selected state (step S2).

Then, switching portion 126 determines whether or not the touch input has continued for a prescribed period of time (step S3). Specifically, whether or not the selected state of the object in response to the touch input has continued for a prescribed period of time is determined. For example, the prescribed period of time can be set to 2 to 3 seconds. The period of time is by way of example, and a person skilled in the art could adjust as appropriate the period of time.

When it is determined in step S3 that the touch input has continued for a prescribed period of time (YES in step S3), movement control processing is performed (step S5). Specifically, when switching portion 126 determines that the touch input has continued for a prescribed period of time, it switches processing by object posture control unit 122 and instructs object movement control unit 125 to perform processing.

Then, the process ends (return).

When it is determined in step S3 that the touch input has not continued for a prescribed period of time (NO in step S3), posture control processing is performed (step S4). When switching portion 126 determines that the touch input has not continued for a prescribed period of time, it instructs object posture control unit 122 to perform processing.

Then, the process ends (return).

When input acceptance portion 121 determines in step S0 that no touch input is provided (NO in step S0), it determines whether or not the touch input has ended (touch off) (step S6). Specifically, when input acceptance portion 121 determines that a touch input was provided in a previous cycle and no touch input is provided in the present cycle, it determines that the touch input has ended (touch off).

When input acceptance portion 121 determines in step S6 that the touch input has ended (touch off) (YES in step S6), it determines whether or not the marker object is in the selected state (step S7).

When input acceptance portion 121 determines in step S7 that the marker object is in the selected state (YES in step S7), it cancels selection of the marker object (step S8).

Then, movement control determination processing is performed (step S9). The movement control determination processing is processing for determining whether or not a marker object has moved to an appropriate position (a movement-allowed region) through the movement control processing and performing prescribed processing based on a result of determination.

Then, the process ends (return).

When input acceptance portion 121 determines in step S1 that no input for selection of a marker object has been provided (NO in step S1), a touch input is invalid and the process proceeds to step S6.

Then, when input acceptance portion 121 determines in step S6 that the touch input has not ended (touch off) (NO in step S6) or determines in step S7 that the marker object is not in the selected state (NO in step S7), the process ends (return).

<Posture Control Processing>

Figure 13:
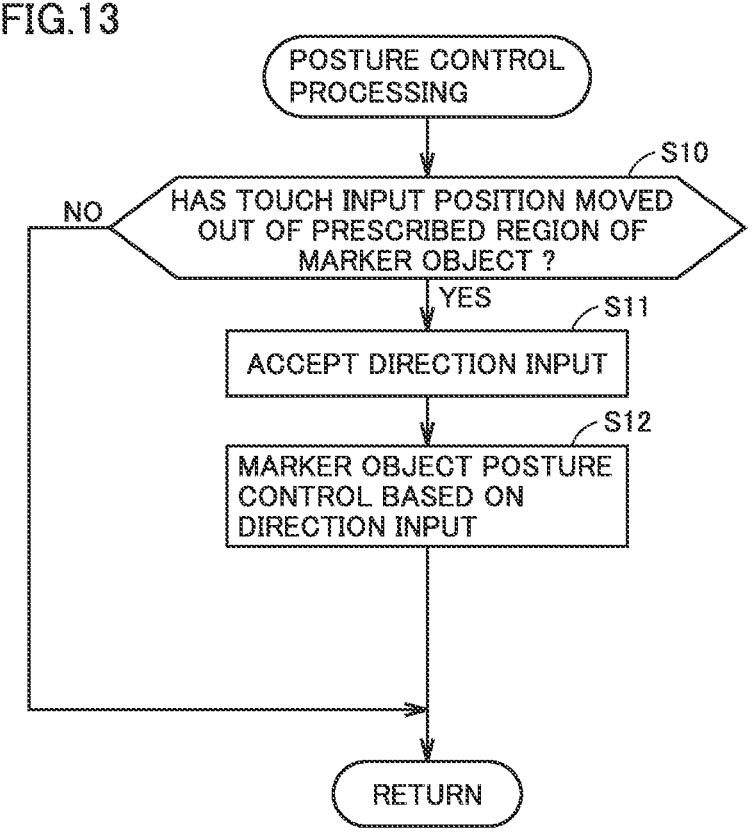
FIG. 13 shows an exemplary illustrative non-limiting diagram illustrating a flow of object posture control processing according to the exemplary embodiment.

FIG. 13 is a diagram illustrating a flow of object posture control processing based on the embodiment. The processing is processing mainly by object posture control unit 122.

As shown in FIG. 13, whether or not a position of touch input has moved out of a prescribed region of a marker object is determined (step S10). Here, the prescribed region is set to a circular region of a selected marker object by way of example. Touch panel controller 601 generates touch position data and outputs the data to CPU 605. CPU 605 has RAM 16 successively save the generated touch position data. CPU 605 (object posture control unit 122) compares the touch position data saved in RAM 16 and the prescribed region (the circular region) of the marker object with each other and determines whether or not the touch position data is present outside the prescribed region (the circular region) of the marker object.

When it is determined in step S10 that the position of touch input has not moved out of the prescribed region of the marker object (NO in step S10), the process ends without carrying out posture control for the marker object (return).

When the position of touch input is within the circular region of the marker object, posture control is not carried out. By providing an allowance (a margin) comparable to the prescribed region in carrying out posture control for the marker object, change in posture of the marker due to hypersensitive reaction is suppressed and user operability can be improved.

When it is determined in step S10 that the position of touch input has moved out of the prescribed region of the marker object (YES in step S10), a direction input is accepted (step S11). Specifically, an input of a direction connecting central coordinate P of the marker object to a position of touch input is accepted.

Then, a posture of the marker object is controlled based on the direction input (step S12). Specifically, a posture of the marker is controlled such that the accepted direction input is set as the orientation (the direction of a line of sight) of the marker. In this case, the orientation (the direction of a line of sight) is controlled by rotation of the marker with the central coordinate of the marker being defined as the fulcrum.

Then, the process ends (return).

The process ends (return) while selection of the marker object in a next cycle is maintained. In this case, when the touch input has continued, posture control processing is continued in the next cycle.

Thus, as shown, for example, in FIG. 9 (B), when a touch input has continued after change in posture of the marker object as a result of movement of the position of the touch input out of the prescribed region of the marker object, the selected state of the marker object is maintained and a posture of the marker object can be controlled based on another direction input.

Then, a posture of the marker is controlled such that an input of direction connecting central coordinate P of the marker object to a position of touch off is set as the orientation (the direction of a line of sight) of the marker.

Though a case that an input of direction connecting central coordinate P of the marker object to a position of touch off is accepted and a posture is controlled such that a direction input is set as the orientation of the marker is described in the present example, limitation thereto is not particularly intended, and for example, an average of trace directions from movement of a position of touch input out of a prescribed region of a marker object until lapse of a prescribed number of cycles (inclination of the trace for each cycle) may be accepted as a direction input and a posture may be controlled such that the direction input is set as an orientation of the marker. Alternatively, an average of trace directions for a prescribed number of cycles before touch off may be accepted as a direction input, or an input of direction connecting central coordinate P of the marker object to a position of touch input a prescribed number of cycles before touch off may be accepted in order to suppress shake at the time of touch off.

<Movement Control Processing>

Figure 14:
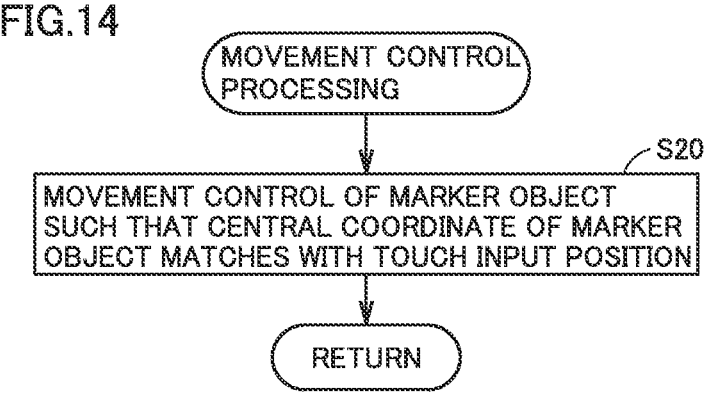
FIG. 14 shows an exemplary illustrative non-limiting diagram illustrating a flow of object movement control processing according to the exemplary embodiment.

FIG. 14 is a diagram illustrating a flow of object movement control processing based on the embodiment. The processing is processing mainly by object movement control unit 125.

As shown in FIG. 14, movement of a marker object is controlled such that a central coordinate of the marker object matches with a position of touch input (step S20). Touch panel controller 601 generates touch position data and outputs the data to CPU 605. CPU 605 has RAM 16 successively save the generated touch position data. CPU 605 (object movement control unit 125) controls movement of the marker object such that central coordinate P of the selected marker object is superimposed on the touch position data saved in RAM 16.

Then, the process ends (return).

The process ends (return) while selection of the marker object in a next cycle is maintained. In this case, when a touch input has continued, movement control processing is continued in the next cycle.

<Movement Control Determination Processing>

The movement control determination processing is processing for determining whether or not a position of a marker object which has moved through the object movement control processing is within a movement-allowed region. When determination as not being in a movement-allowed region is made, a marker object is moved to an appropriate movement-allowed region.

Figure 15:
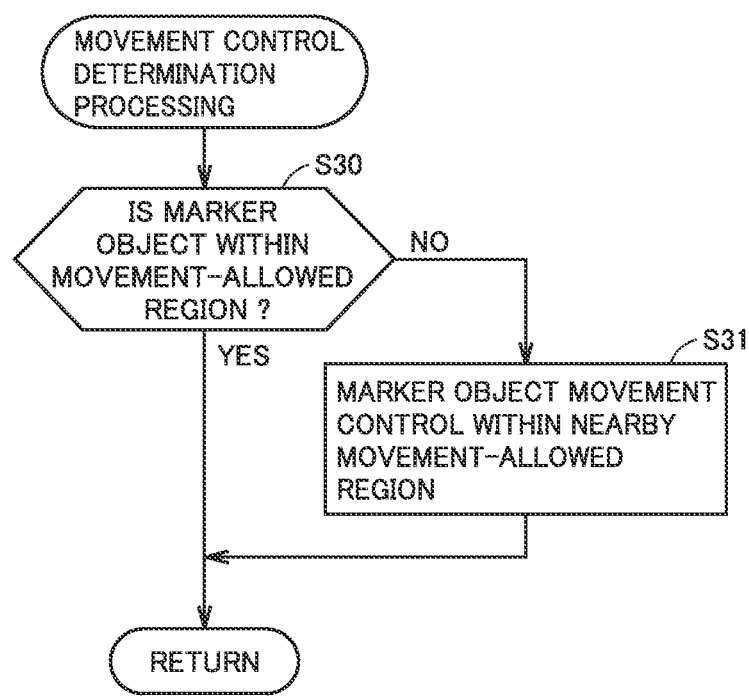
FIG. 15 shows an exemplary illustrative non-limiting diagram illustrating a flow of object movement control determination processing according to the exemplary embodiment.

FIG. 15 is a diagram illustrating a flow of the object movement control determination processing based on the embodiment. The processing is processing mainly by object movement control unit 125.

As shown in FIG. 15, whether or not a position of a marker object is within a movement-allowed region is determined (step S30).

When it is determined in step S30 that the position of the marker object is within the movement-allowed region (YES in step S30), the process ends (return).

When it is determined that the position of the marker object is not within the movement-allowed region (NO in step S30), the marker object is controlled to be moved from a current position (a position of touch off) to a nearby movement-allowed region (step S31). Specifically, as shown in FIG. 10 (D), a marker object is controlled to be moved to a closest movement-allowed region.

Then, the process ends (return).

(Modification)

Though a case where object movement control unit 125 controls movement of a marker while a posture thereof is maintained in movement control processing of a marker object has been described above, a posture of a marker may also be controlled. Specifically, a direction input for a direction of movement may be accepted based on a trace of positions of touch input and a posture may also be controlled such that an input of the direction of movement is set as an orientation of the marker.

Though movement control by object movement control unit 125 in the present example allows temporary movement of a marker as following a position of touch input to a position which is not within movement-allowed region 302, movement of a marker may be allowed only within movement-allowed region 302. With such a scheme, when an attempt to move a marker in a manner following a position of touch input out of movement-allowed region 302 is made, it is determined that the touch input has ended (touch off) because the position of touch input is present outside movement-allowed region 302, and hence movement of the marker is stopped. In that case, for an orientation of a marker as well, an input of direction connecting central coordinate P of the marker object to a position of touch off may be accepted and a posture may be controlled such that the direction input is set as an orientation of the marker.

Other Embodiments

Though control of a surveillance camera object within a game space has been described in the embodiment above, limitation to the game space is not particularly intended and a surveillance camera in a real space can also be controlled.

Specifically, information processing apparatus 10 and a surveillance camera may be connected to be able to communicate with each other, and the surveillance camera should only be controlled in accordance with an instruction from the information processing apparatus. For example, a camera drive portion capable of rotating and moving an orientation of the surveillance camera may be provided in the surveillance camera, and information processing apparatus 10 should only instruct the camera drive portion to control the surveillance camera.

Connection between the surveillance camera and information processing apparatus 10 may be wired or wireless.

For example, in the embodiment above, a plurality of types of processing shown in FIG. 11 may be performed by one computer (CPU 12) or performed as distributed to a plurality of computers making use of a server apparatus. Through the processing, for example, processing heavy in processing load is performed by a server apparatus for distribution of processing. Thus, high-speed information processing can be realized. Similarly also in other embodiments, information processing making use of a server apparatus can also be performed.

An application executable by a personal computer may be provided as a program in the present embodiment. A read only memory (ROM) or a storage device in which a program and various types of data are computer (or CPU)-readably recorded (which is referred to as a "recording medium") or a random access memory (RAM) developing a program may be provided. A "non-transitory tangible medium" such as a tape, a disc, a card, a semiconductor memory, or a programmable logic circuit can be employed as the recording medium. The program may be supplied to the computer through any transmission medium which can transmit the program (a communication network or broadcast waves). The present embodiment may be realized also in a form of a data signal embedded in carrier waves, in which the program is embodied by electronic transmission.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims. The word "comprising" does not exclude the presence of elements or steps other than those listed in a claim. The word "a" or "an" preceding an element does not exclude the presence of a plurality of such elements.

What is claimed is:

1. A non-transitory computer-readable storage medium storing an information processing program which, when executed by a computer of an information processing apparatus, causes the computer to control the information processing apparatus to perform operations comprising:
   displaying, on a touch screen display, a user interface for use in controlling virtual cameras disposed in a virtual space, the user interface comprising (i) display objects, each of which represents a corresponding one of the virtual cameras, and (ii) for each of one or more respective display objects, at least a part of a region, representing a range within the virtual space, for setting a position of the respective display object;
   setting, in the user interface, an orientation of a first one of the display objects based on a touch input for rotating the first display object while a position of the first display object is maintained;
   controlling a direction of a line of sight of the virtual camera represented by the first display object based on the set orientation of the first display object; and
   displaying a picked-up image of the virtual space picked up by the virtual camera represented by the first display object.

2. The non-transitory computer-readable storage medium according to claim 1, wherein the computer controls the information processing apparatus to
   display, in the user interface, at least part of an arrangement map, the arrangement map showing one or more of the regions for setting positions of the display objects.

3. The non-transitory computer-readable storage medium according to claim 1, wherein the computer controls the information processing apparatus to perform operations for controlling movement of the first display object in the user interface based on a touch input for moving the first display object.

4. The non-transitory computer-readable storage medium according to claim 1, wherein
   the computer controls the information processing apparatus to perform operations for controlling the orientation of the first display object based on a direction of rotational movement of the first display object in response to the touch input for rotating the first display object.

5. The non-transitory computer-readable storage medium according to claim 3, wherein
   the computer controls the information processing apparatus to perform operations for setting a position of the first display object or to perform operations for setting the orientation of the first display object based on a time period for which the first display object is selected in response to a touch input to the touch panel.

6. The non-transitory computer-readable storage medium according to claim 5, wherein the computer controls the information processing apparatus to perform operations comprising
   switching to a touch input for moving the first display object from a touch input for rotating the first display object when a time period for which the first display object is selected in response to a touch input continues for or exceeds a prescribed period of time.

7. The non-transitory computer-readable storage medium according to claim 1, wherein
   the information processing apparatus is connected to a display device other than the touch screen display device, and
   the other display device displays the picked-up image.

8. The non-transitory computer-readable storage medium according to claim 7, wherein
   the touch screen display device comprises a hand-held display device, and
   the other display device comprises a stationary display device.

9. The non-transitory computer-readable storage medium according to claim 1, wherein the computer controls the information processing apparatus to
   display picked-up images picked up by multiple ones of the virtual cameras.

10. The non-transitory computer-readable storage medium according to claim 1, wherein the computer controls the information processing apparatus to
    accept an input for selecting one display object of the plurality of display objects, and
    display the picked-up image picked up by the virtual camera represented by the selected display object in a highlighted manner as compared with picked-up images picked up by other virtual cameras represented by remaining display objects.

11. The non-transitory computer-readable storage medium according to claim 10, wherein the computer controls the information processing apparatus to
    display the picked-up image picked up by the virtual camera represented by the selected display object so as to be surrounded by picked-up images picked up by all virtual cameras.

12. The non-transitory computer-readable storage medium according to claim 1, wherein the computer controls the information processing apparatus to
    allocate a first marker for identifying each of the plurality of display objects and display the first marker, and
    allocate a second marker corresponding to the picked-up image from the virtual camera and display the second marker.

13. The non-transitory storage medium according to claim 12, wherein
    the first marker comprises a symbol corresponding to the virtual camera.

14. An information processing apparatus, comprising a computer including a hardware processor, the computer being configured to implement at least:
    a display module for controlling displaying, on a touch screen display, of a user interface for use in controlling virtual cameras disposed in a virtual space, the user interface comprising (i) display objects, each of which represent a corresponding one of the virtual cameras, and (ii) for each of one or more respective display objects, at least a part of a region, representing a range within the virtual space, for setting a position of the respective object;
an object orientation setting module for controlling setting, in the user interface, of an orientation of a first one of the display objects based on a touch input for rotating the first display object while a position of the first display object is maintained;
a virtual camera control module for controlling a direction of a line of sight of the virtual camera represented by the first display object based on the set orientation of the first display object; and
a picked-up image display module for displaying a picked-up image of the virtual space picked up by the virtual camera represented by the first display object.

15. A method of controlling an information processing apparatus, comprising:
displaying a user interface for use in controlling virtual cameras disposed in a virtual space, the user interface comprising (i) display objects, each of which represents a corresponding one of the virtual cameras, and (ii) for each of one or more respective display objects, at least a part of a region, representing a range within the virtual space, for setting a position of the respective display object;
setting, in the user interface, an orientation of a first one of the display objects based on a touch input for rotating the first display object while a position of the first display object is maintained;
controlling a direction of a line of sight of the virtual camera represented by the first display object based on the set orientation of the first display object; and
displaying a picked-up image of the virtual space picked up by the virtual camera represented by the first display object.

16. An information processing system, comprising:
a memory storing a program;
a display; and
processing circuitry in communication with the memory and the display, the processing circuitry being configured to execute the program stored in the memory to control the information processing system to at least:
display, on a touch screen display, a user interface for use in controlling virtual cameras disposed in a virtual space, the user interface comprising (i) display objects, each of which represents a corresponding one of the virtual cameras, and (ii) for each of one or more respective display objects, at least a part of a region representing a range within the virtual space for setting a position of the respective display object;
set, in the user interface, an orientation of a first one of the display objects based on a touch input for rotating the first display object while a position of the first display object is maintained;
control a direction of a line of sight of the virtual camera represented by the first display object based on the set orientation of the first display object; and
display a picked-up image of the virtual space picked up by the virtual camera represented by the first display object.

17. An apparatus comprising:
a touchscreen display;
a memory storing a program; and
a processor including hardware circuitry, the processor being configured to execute the program stored in the memory to control the apparatus to perform operations comprising:
generating a display on the touchscreen display corresponding to a virtual space, the display including a touch image disposed in a region visually indicative of an allowable range for setting a position of the touch image, the touch image representing a virtual camera for capturing images of the virtual space and the allowable range representing a range in the virtual space within which the virtual camera is positionable;
accepting a touch input to the touchscreen display for rotating the touch image while a position of the touch image is maintained;
controlling a direction of a line of sight of the virtual camera in the virtual space based on the rotating of the touch image; and
generating a display based on images of the virtual space captured by the virtual camera.

18. The apparatus according to claim 17, further comprising:
an additional display.

19. The apparatus according to claim 17, wherein the touch image includes a feature indicative of the line of sight into the virtual space of the virtual camera represented by the touch image.

* * * * *